(No Model.)
C. H. THURSTON.
WIRE SUSPENSION HOOK.
No. 454,891. Patented June 30, 1891.
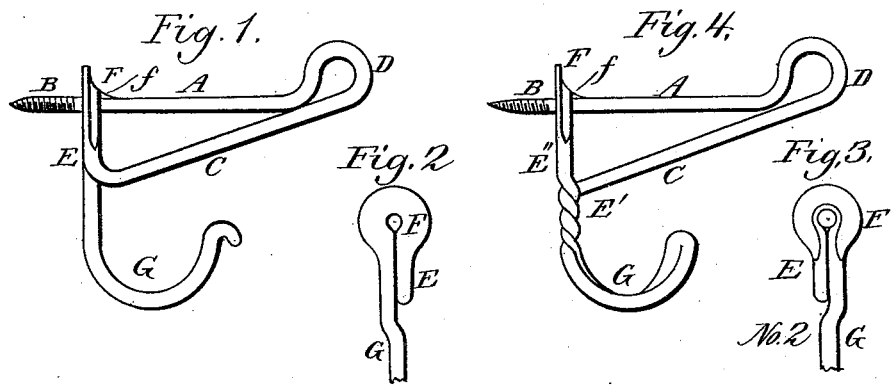
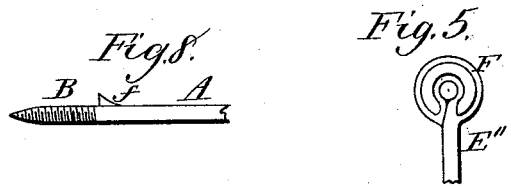
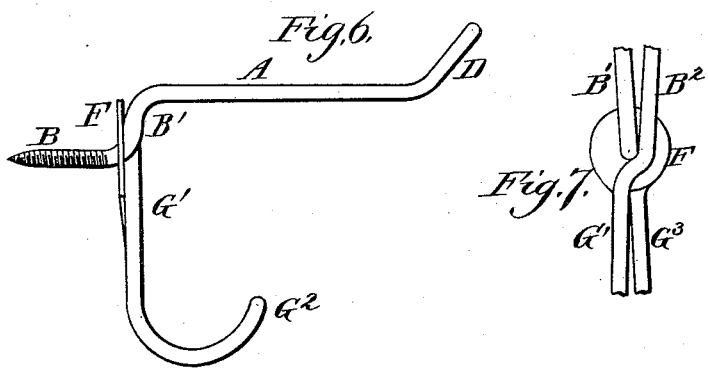
Witnesses
George A Russell
Robert Aldrich
Inventor
Charles H Thurston

UNITED STATES PATENT OFFICE.

CHARLES H. THURSTON, OF BOSTON, MASSACHUSETTS, ASSIGNOR TO FRANK W. THURSTON, OF SAME PLACE.

WIRE SUSPENSION-HOOK.

SPECIFICATION forming part of Letters Patent No. 454,891, dated June 30, 1891.

Application filed May 12, 1890. Serial No. 351,547. (No model.)

*To all whom it may concern:*

Be it known that I, CHARLES H. THURSTON, of Boston, in the county of Suffolk and State of Massachusetts, a citizen of the United States, have invented certain new and useful Improvements in Wire Suspension-Hooks, of which the following is a full, clear, and exact description, reference being had to the accompanying drawings, making part of the specification.

In the drawings, Figure 1 is a side elevation of a hook constructed, generally, in the manner described in my patent, No. 407,797, dated July 30, 1889, with the present improvement added. Fig. 2 is a rear elevation of that part of the same hook which contains my present improvement, and Fig. 3 is a front elevation of that part of the same hook which contains my present improvements. Fig. 4 is a side elevation of a hook, such as is described in a pending application for a patent made by me, with my present improvement applied thereto; and Fig. 5 is a front elevation of that part of the hook shown in Fig. 4 which contains my present improvement. Fig. 6 is a side elevation of a double hook formed of a somewhat familiar type, to which my present improvement has been added; and Fig. 7 is a front elevation of that part of the hook shown in Fig. 6 which contains my present improvement. Fig. 8 is a detail of the hook shown in Figs. 1 and 4.

All of these hooks are made of a continuous piece of wire. They all contain a screw-shank. (Marked in all the drawings B.) In Fig. 1 this screw-shank is extended into a horizontal arm A, which arm is bent upward, forward, and downward, as shown at D, and then backward into the brace C. It is then turned upward, as shown at E, and brought over the shank and arm B A, and then carried downward, outward, and upward to form the hook G. Hooks of this class have a patent defect which, however, does not prevent them from being exceedingly useful; but it is to improve them in this defective particular that the present invention is directed. In the ordinary hook as made the wire is allowed to remain round at the place where it crosses the shank; but in order to make a broad and solid base I swage the wire so as to flatten it on the back and form a ridge upon the front closely compressed against the shank of the hook, as shown at F, Fig. 1. The rear aspect of the hook so treated is shown in elevation in Fig. 2, and the enlarged base is marked F in that figure. The front aspect of this enlarged base is shown at F in Fig. 3. In order that this enlarged base may fit tightly against the wall and may not slip forward upon the arm A of the hook, I form a small fin by nipping the wire of the shank from side to side, so as to raise it in the center, as shown in detail in Fig. 8 and in connection with the enlarged base in Figs. 1 and 4.

The hook of Fig. 4 differs from the hook of Fig. 1 in this respect: The shank B, arm A, end loop D, and brace C are substantially as shown in Fig. 1; but instead of the brace turning upward to surround the shank A immediately it turns downward and is formed into the hook G', which is made with a return-bend and the wire carried inward and upward and twisted a turn and a half at the point marked E', and thence from the twist is carried up, as shown at $E^2$, Fig. 4, and turned around the shank. The turn around the shank is then swaged to form, as shown at F in Figs. 4 and 5. The rear aspect of this base F differs so little from the rear aspect of the base of the other hook, as shown in Fig. 2, that it has not been thought necessary to illustrate. A similar fin *f* is made in the arm A of the hook illustrated in Fig. 4, just as it is made in a similar place in the hook illustrated in Fig. 1.

Figs. 6 and 7 illustrate a hook which is double in every part except in the shank. The wire proceeding from the shank B is bent upward and forward, as shown at b', Fig. 6, and then continued into the shank A. This shank A is then bent upward into the loop D, and being turned sidewise into a return-bend the wire follows back parallel to the part shown at A, and is turned downward, as shown at $b^2$ of Fig. 7. It is then bent laterally and beneath the shank B, and then turned downward into the part G' of the lower hook. This lower hook is made with a return-bend at its extremity $G^2$, which return-bend, however, is a lateral and not a vertical bend. The wire is then continued backward parallel to itself, and finally brought up, as G³, toward the shank B, and there is wrapped round it in substantially the same manner as in the hook illustrated in Fig. 4, and this loop which surrounds the shank is swaged into a flat washer, as shown at F in Figs. 6 and 7. This form of hook, it will be seen, does not require the fin *f*, (shown in Figs. 1, 4, and 8,) because of the upward bend shown at *b'* in Fig. 6; but the improvement in flattening the eye which surrounds the shank of the hook, and thus furnishing a broad flat base for the hook to screw up against, a base which has substantially the same steadying power that the head of a screw would have, and is the same in all of the varieties of hook illustrated in the drawings.

Having thus fully described my invention, I claim and desire to secure by Letters Patent of the United States—

1. A bent-wire suspension-hook having a screw-shank B, a flattened base F, which surrounds said shank B, and a fin integral with the said shank, substantially as described.

2. A hook formed of continuous wire and containing the following parts integral with the said wire: a screw-shank B, a suspension-arm A, a brace C, and a flattened base F of different cross-section from the rest of the wire, substantially as described.

3. A hook formed of continuous wire and containing the following parts integral with the said wire: a screw-shank B, a suspension-arm A, a brace C, a flattened base F of different cross-section from the rest of the wire, and a fin *f*, integral with the arm A, substantially as described.

CHARLES H. THURSTON.

Witnesses:
 THOS. WM. CLARKE,
 ROBERT ALDRICH.